United States Patent
Shimizu

(10) Patent No.: US 11,016,449 B2
(45) Date of Patent: May 25, 2021

(54) DUPLEXING PROCESS CONTROL DEVICE

(71) Applicant: MITSUBISHI ELECTRIC CORPORATION, Tokyo (JP)

(72) Inventor: Toshihiko Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/571,083

(22) PCT Filed: Jul. 23, 2015

(86) PCT No.: PCT/JP2015/070960
§ 371 (c)(1),
(2) Date: Nov. 1, 2017

(87) PCT Pub. No.: WO2017/013785
PCT Pub. Date: Jan. 26, 2017

(65) Prior Publication Data
US 2018/0164753 A1    Jun. 14, 2018

(51) Int. Cl.
G05B 9/03    (2006.01)

(52) U.S. Cl.
CPC ..................... *G05B 9/03* (2013.01)

(58) Field of Classification Search
CPC .......................................................... G05B 9/03
See application file for complete search history.

(56) References Cited

U.S. PATENT DOCUMENTS

| 4,472,806 | A | * | 9/1984 | Blair | G05B 9/03 |
| | | | | | 714/820 |
| 5,313,386 | A | * | 5/1994 | Cook | G05B 9/03 |
| | | | | | 700/82 |
| 5,434,998 | A | * | 7/1995 | Akai | G06F 11/20 |
| | | | | | 709/213 |

(Continued)

FOREIGN PATENT DOCUMENTS

JP    5421894 B2    2/2014

OTHER PUBLICATIONS

International Search Report (PCT/ISA/210) dated Oct. 27, 2015, by the Japanese Patent Office as the International Searching Authority for International Application No. PCT/JP2015/070960.
Written Opinion (PCT/ISA/237) dated Oct. 27, 2015, by the Japanese Patent Office as the International Searching Authority for International Application No. PCT/JP2015/070960.

(Continued)

*Primary Examiner* — Hassan Kizou
*Assistant Examiner* — Abdullahi Ahmed
(74) *Attorney, Agent, or Firm* — Buchanan Ingersoll & Rooney PC

(57) ABSTRACT

An address and a control data accessed when the CPU performs the program calculation in the control data memory of the control system controller are transmitted to the standby system controller, in the standby system controller, the control data transmitted from the control system controller to the address transmitted from the control system controller before the program calculation of the CPU of the standby system controller is expanded, the control data equalization of the control system controller and the standby system controller is performed, the control data is efficiently transmitted from the control system controller to the standby system controller, thus, the processing performance of the duplexing process control device is improved.

6 Claims, 6 Drawing Sheets

(56) References Cited

U.S. PATENT DOCUMENTS

| | | | | | |
|---|---|---|---|---|---|
| 5,638,507 | A | * | 6/1997 | Akai | G06F 11/2025 |
| | | | | | 714/13 |
| 6,170,044 | B1 | * | 1/2001 | McLaughlin | G05B 9/03 |
| | | | | | 711/112 |
| 6,550,018 | B1 | * | 4/2003 | Abonamah | G06F 11/165 |
| | | | | | 714/11 |
| 7,212,731 | B1 | * | 5/2007 | Morotomi | G11B 19/025 |
| | | | | | 348/E5.024 |
| 10,332,235 | B1 | * | 6/2019 | Amento | G06F 15/1735 |
| 2008/0091896 | A1 | * | 4/2008 | Usami | G06F 11/1456 |
| | | | | | 711/162 |
| 2015/0036194 | A1 | * | 2/2015 | Arai | H04N 1/2108 |
| | | | | | 358/403 |
| 2018/0011482 | A1 | * | 1/2018 | Ko | G05B 9/03 |

OTHER PUBLICATIONS

Extended European Search Report dated Apr. 25, 2019, issued by the European Patent Office in corresponding European Application No. 15898944.2. (10 pages).
Office Action dated Apr. 14, 2020, by the Chinese Patent Office in corresponding Chinese Patent Application No. 201580081710.4 and English translation of the Office Action. (16 pages).
Office Action (Communication pursuant to Article 94(3) EPC) dated Jun. 2, 2020, by the European Patent Office in corresponding European Patent Application No. 15898944.2. (8 pages).
Office Action (Communication pursuant to Article 94(3) EPC) dated Oct. 22, 2020, by the European Patent Office in corresponding European Patent Application No. 15898944.2. (12 pages).
Office Action dated Dec. 28, 2020, by the Chinese Patent Office in corresponding Chinese Patent Application No. 201580081710.4 and English translation of the Office Action. (11 pages).
Office Action dated Mar. 17, 2021 issued corresponding European Patent Application No. 15898944.2 (8 pages).

* cited by examiner

FIG. 6

| Start information 1 |
| Start information 2 |
| Address 1 |
| Data 1 |
| Address 2 |
| Data 2 |
| Address 3 |
| Data 3 |
| . |
| . |
| . |
| Address n |
| Data n |

FIG. 7

| Start information 1 |
| Start information 2 |
| Address 1 |
| Data 1 |
| Address 2 |
| Data 2 |
| Address 3 |
| Data 3 |
| . |
| . |
| . |
| Address n |
| Data n |
| End information 1 |
| End information 2 |

DUPLEXING PROCESS CONTROL DEVICE

TECHNICAL FIELD

The present invention relates to a duplexing process control device configured in a control system controller as well as a standby system controller, and particularly to the equalization of the control data of the standby system controller with the control data of the control system controller.

BACKGROUND ART

Since process control devices that control various plants such as power plants and factories have a great influence on the society due to plant shutdown caused by abnormalities, generally, by configuring a control device in a duplexing configuration, even if an abnormality occurs in one of the control devices, the other control device can continue the operation.

In the duplexing process control device, when the control is transferred to the standby system controller due to an abnormality of the control system controller, in order to prevent a sudden change in the control data, it is necessary for the control data used by the control system controller to be equalized with the standby system controller.

As a method for equalizing the control data, the adopted method is that the control data after the calculation process is transmitted from the control system controller to the standby system controller, in the standby system controller, the control data transmitted from the control system controller is expanded in its own memory.

As a prior art document related to the present invention, in Japanese Patent No. 5421894, the main system controller operates in a control cycle configured with the process input, the calculation process, the process output, and the matching control data transmission. In addition, the standby system controller operates in a control cycle configured with the process input, the calculation process, the non-process, and the matching control data reception. Since the process output is not performed by the standby system controller, it is not processed as a dummy cycle.

The main system controller extracts the control data to be matched from the control data memory and transmits it to the standby system controller via the matching control data transfer unit.

The standby system controller receives the data to be matched received via the matching control data transfer unit and overwrites the received control data to the storage address of the standby system control data corresponding to the control data in the control data memory.

[Patent Literature 1] JP 5421894 B2 (FIG. 2)

DISCLOSURE OF INVENTION

Technical Problem

In the method disclosed in Patent Document 1, after the executing process input, the calculation process and the process output, the control data is transferred in the matching control data transmission processing period, when there is a large amount of control data that needs to be matched, there is a problem that it takes time to transmit the matching control data.

In addition, since the matching control data transmission process is allocated within the control cycle, the time allocated to the program calculation and the process input/output, which are the original function, is insufficient, the control cycle is lengthened and the program operation and the process input/output become allocated, there is a problem that the performances decrease.

Further, when transferring control data from the control system controller to the standby system controller the during program calculation, it is necessary to avoid conflict with the program calculation of the standby system.

The present invention was made in the light of the circumstances as described above, and it is an object of the present invention to efficiently transmit the control data from the control system controller to the standby system controller, and to improve the processing performance of the duplexing process control device even when there is a large amount of control data to be equalized.

Solution to Problem

A duplexing process control device according to the present invention includes a control system controller and a standby system controller, wherein a control data targeting a program calculation and a process input/output by a CPU of the control system controller is stored in a control data memory of the control system controller, wherein an address in the control data memory and the control data in the control data memory which are accessed when the CPU performs a program calculation are transmitted to the standby system controller, and wherein, in the standby system controller, the control data transmitted from the control system controller is expanded to the address transmitted from the control system controller before the program calculation of a CPU of the standby system controller, thereby a control data equalization of the control system controller and the standby system controller is performed, therefore the control data is efficiently transmitted from the control system controller to the standby system controller, the processing calculation performance of the duplexing process control device is improved.

Advantageous Effects of Invention

Since a duplexing process control device according to the present invention includes a control system controller and a standby system controller, wherein a control data targeting a program calculation and a process input/output by a CPU of the control system controller is stored in a control data memory of the control system controller, wherein an address in the control data memory and the control data in the control data memory which are accessed when the CPU performs a program calculation are transmitted to the standby system controller, and wherein, in the standby system controller, the control data transmitted from the control system controller is expanded to the address transmitted from the control system controller before the program calculation of a CPU of the standby system controller, thereby a control data equalization of the control system controller and the standby system controller is performed, the control data is efficiently transmitted from the control system controller to the standby system controller, and there is an effect that the processing calculation performance of the duplexing process control device is improved.

BRIEF DESCRIPTION OF DRAWINGS

FIG. 6 is a memory content configuration diagram showing the memory content, i.e. content of transmission data, of control data stored in a buffer memory according to the fourth embodiment of the present invention.

FIG. 7 is a memory content configuration diagram showing the memory content, i.e. content of transmission data, of control data stored in a buffer memory according to the fifth embodiment of the present invention.

DESCRIPTION OF EMBODIMENTS

First Embodiment

Figure 1:
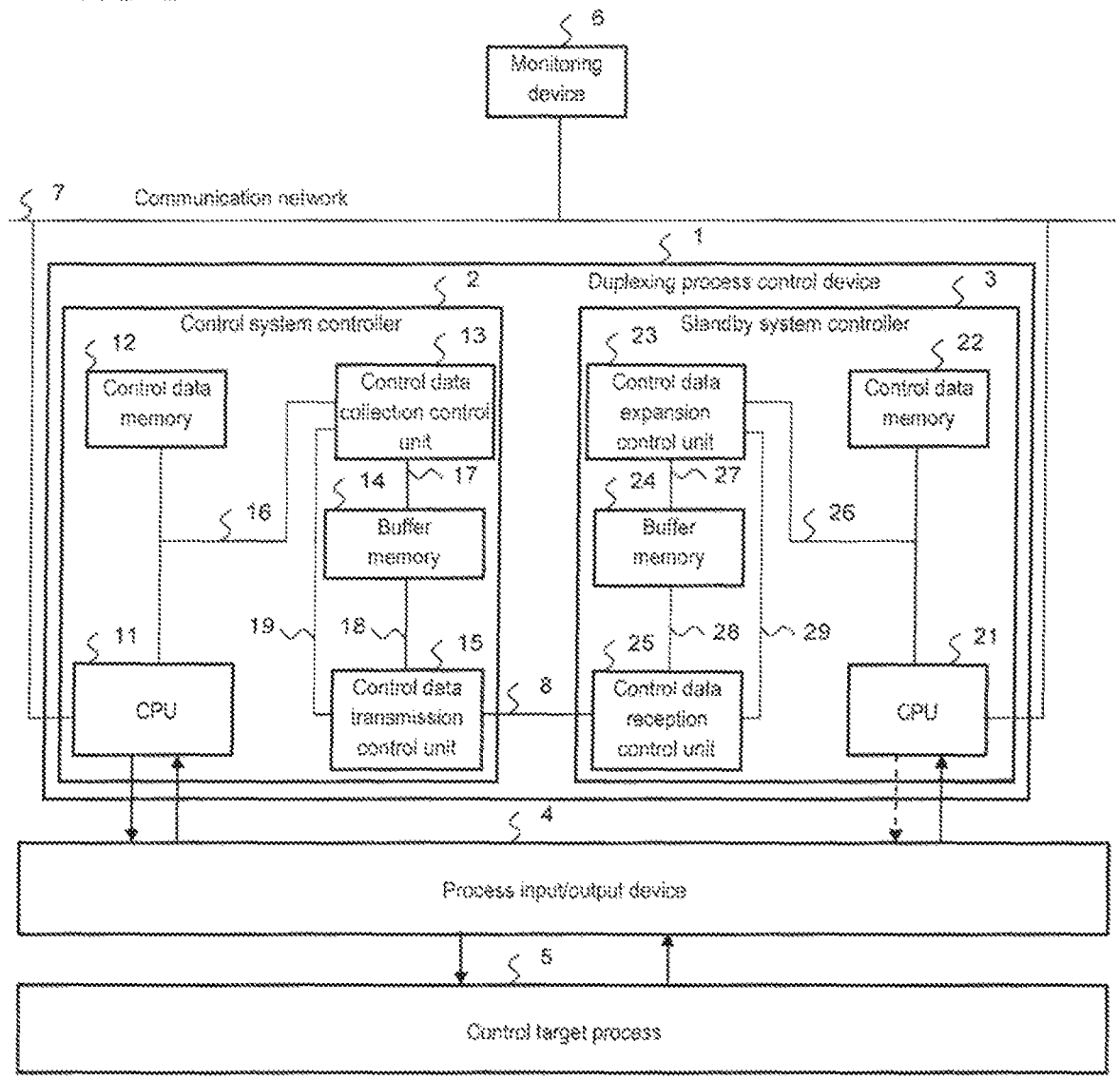
FIG. 1 is a block diagram showing an example of a duplexing process control device according to the first embodiment of the present invention.

Hereinafter, a first embodiment of the present invention will be described with reference to Figs. FIG. 1 shows a configuration example of a duplexing process control device according to the present invention.

In FIG. 1, the duplexing process control device 1 provides a control system controller 2 and a standby system controller 3.

The control system controller 2 includes a CPU 11, a control data memory 12, a control data collection control unit 13, a buffer memory 14, a control data transmission control unit 15, a CPU bus 16, a buffer memory input bus 17, and a buffer memory output bus 18.

The standby system controller 3 includes a CPU 21, a control data memory 22, a control data expansion control unit 23, a buffer memory 24, a control data reception control unit 25, a CPU bus 26, a buffer memory output bus 27, and a buffer memory input bus 28.

In addition, in FIG. 1, a process input/output device 4 is an input/output device of the duplexing process control device 1.

In the duplexing process control device 1, the data of process state information from a control target process 5 via the process input/output device 4 are inputted, the data of process control command information corresponding to the state of the control target process 5 are generated by the CPU 11 by predetermined program calculation for process control, the data of the generated process control command information are outputted to the control target process 5 via the process input/output device 4, In the control target process 5, the control is performed according to the data of the process control command information.

The data of the process state information and the data of the process control command information are also called control data in the process control.

A monitoring device 6 acquires the state information of the control target process 5 from the duplexing process control device 1 via the communication network 7 and monitors the state of the control target process 5.

Next, the operation will be described.

In the control system controller 2, a control cycle including process input, program operation, process output, and control network communication processing are executed at regular intervals or at a fixed cycle. See FIG. 2, FIG. 3.

On the other hand, in the standby system controller 3, a control cycle including process input, program operation, control data reception from the control system controller via the control data communication bus 8 for equalization of control data in the standby system controller 3, and the control network communication processing are executed at regular intervals or at a fixed cycle, but no process output is done. See FIG. 2, FIG. 3.

In the program calculation in the CPU 11 of the control system controller 2, the control data, which is the data of the process state information, stored in the control data memory 12 is read and calculated, i.e. predetermined program calculation for process control is executed, and the calculation result, i.e. data of the process control command information, is written into the control data memory 12.

The program calculation of the standby system controller 3 also performs the same operation as the control system controller 2, but according to the equalization of the control data from the control system controller in the previous control cycle, the program control is performed using the same control data as the control system controller 2.

Next, equalization of control data will be described.

In the program operation cycle of the control system controller 2, when the CPU 11 sets the control data collection flag of the control data collection control unit 13, thereafter, when the CPU 11 accesses the control data memory 12 at the time of program calculation of the control system controller, the control data collection control unit 13 stores the memory address and memory data which are output to the CPU bus 16 in the buffer memory 14. This operation is continued while the control data collection flag is set.

The CPU 11 clears the control data collection flag at the end of the program calculation cycle, when the control data collection flag is cleared, the control data collection control unit 13 stops storing the memory address and the memory data in the buffer memory 14.

Next, although the CPU 11 performs a process output operation, at the same time that the control data collection flag is cleared, the control data collection control unit 13 notifies the control data transmission control unit 15 of data transmission by a data transmission notifying signal 19. When the data transmission notification is made, the control data transmission control unit 15 sequentially reads the memory address and the memory data from the head of the buffer memory 14 and transmits them to the standby system controller 3 via the control data communication bus 8. When detecting the area where the memory address and the memory data stored in the buffer memory 14 are not stored, the transmission operation is stopped.

The control data reception control unit 25 of the standby system controller 3, by detecting the control data transmission from the control system controller 2, stores the memory address and the memory data transmitted from the control system controller 2 in the buffer memory 24 of the standby system controller 3, and then the data storage completion is notified to the control data expansion control unit 23 by buffer memory store notifying signal 29.

The control data expansion control unit 23 of the standby system controller 3, by detecting the storage in the buffer memory 24, reads out the address and data stored in the buffer memory 24 and expand them in the control data memory 22. At this time, the standby system controller 3 does not perform the process output process, and since the CPU 21 does not operate, the control data expansion control unit 23 writes the received data to the control data memory 22 with respect to the address received.

Figure 2:
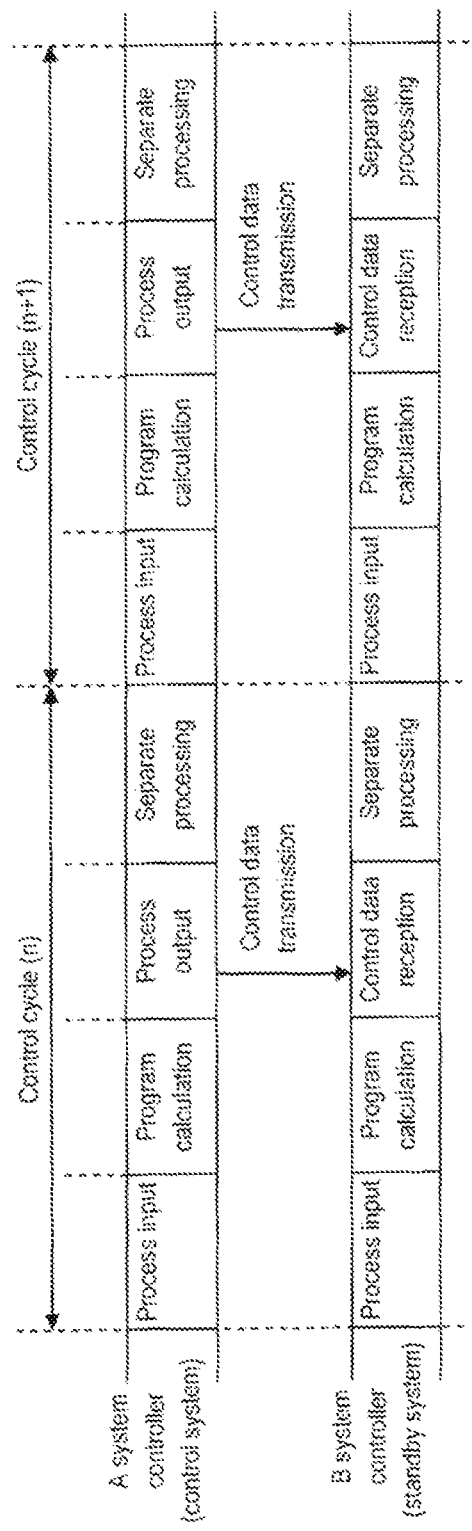
FIG. 2 is an operation explanatory diagram showing an example of a processing in a control cycle of a control system controller according to the first embodiment of the present invention.
Figure 3:
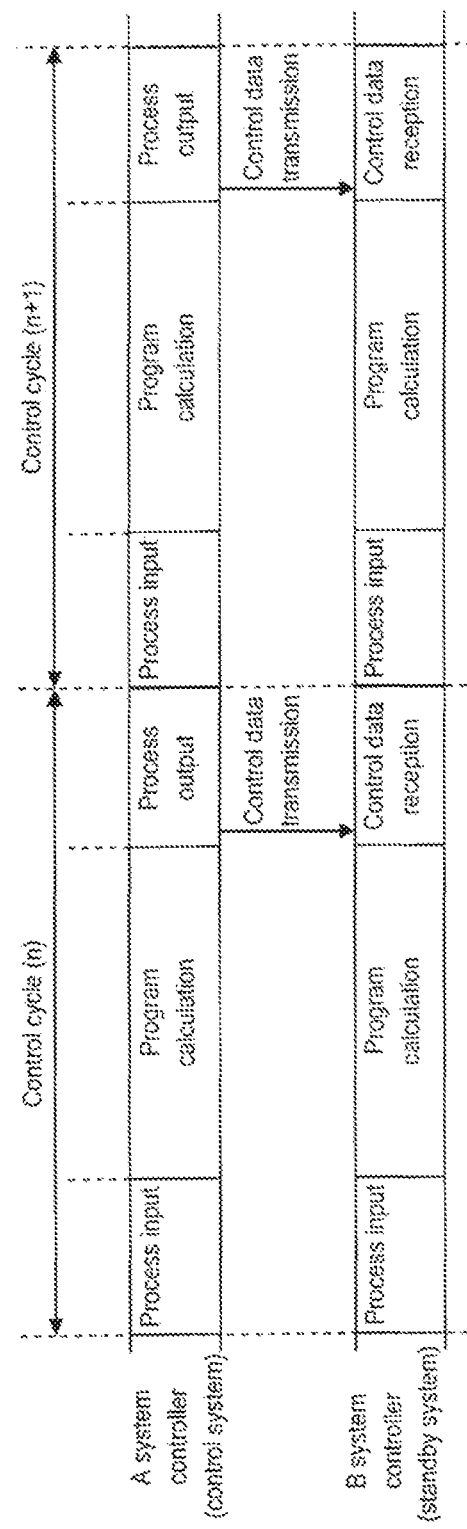
FIG. 3 is an operation explanatory diagram showing an example of a processing in a control cycle of a standby system controller according to the first embodiment of the present invention.

In addition, FIG. 2 and FIG. 3 exemplify the processing in the control cycle of the control system controller 2 and the standby system controller 3 of the duplexing process control device of the present invention, and according to the equalization process performed at the process output by the control system controller 2, it is possible to allocate the idle time of the control cycle to another process as shown in FIG. 2, and to allocate it to the program operation process as shown in FIG. 3.

In the first embodiment, as mentioned above, a control system controller 2 and a standby system controller 3 are configured in the duplexing process control device 1 in which the control data targeting the program calculation and the process input/output by the CPU 11 of the control system controller 3 is stored in the control data memory 12 of the control system controller 2, wherein the address and the control data accessed when the CPU 11 performs the program calculation of the control data memory 12 are transmitted to the standby system controller 3, in the standby system controller 3, before the program calculation of the CPU 21 of the standby system controller 3, the control data transmitted from the control system controller 2 is expanded to the address transmitted from the control system controller 2, and control data equalization of the control system controller 2 and the standby system controller 3 is performed.

Further, in the first embodiment, buffer memory is provided in each of the control system controller 2 and the standby system controller 3, the address and control data accessed when the CPU 11 of the control system controller 2 performs the program calculation are stored in the buffer memory 14 of the control system controller 2 at the time of program calculation of the CPU 11 of the control system controller 2, and the address and the control data stored in the buffer memory 14 of the control system controller 2 at the process output of the control system controller 2 are stored in the buffer memory 24 of the standby system controller 3.

In addition, in the first embodiment, the control system controller 2 includes the buffer memory 14 for saving a data for the equalization simultaneously with the accessing the control data memory 12, in which the data used for program calculation and process input/output processing, by the CPU 11 in the control system controller 2, the control data collection control unit 13 for storing control data in the buffer memory 14 of the control system controller 2, and the control data transmission control unit 15 that transmits the data stored in the buffer memory 14 of the control system controller 2 to the standby system controller 3, and the standby system controller 3 includes the buffer memory 24 for storing data from the control system controller 2, the control data reception control section 25 for controlling to store the data transmitted from the control system controller 2 in the buffer memory 24, and the control data expansion control unit 23 for expanding control data stored in the buffer memory 24 in the control data memory 22.

According to the first embodiment of the present invention, in the control system controller 2, at the same time as the CPU 11 of the control system controller 2 writes the control data used for program calculation and process input/output processing into the control data memory 12, the data for equalization is stored in the buffer memory 14 of the control system controller 2, and after completion of the program calculation, transmitted to the buffer memory 24 of the standby system controller 3 from the buffer memory 14 of the control system controller 2, when the storage in the buffer memory 24 is completed, the standby system controller 3 writes the control data in its own control data memory 22, assign the time allocated for equalization of control data to another processing such as network processing, program calculation, and so on, it is possible to improve availability and performance of the duplexing process control device 1.

Second Embodiment

Figure 4:
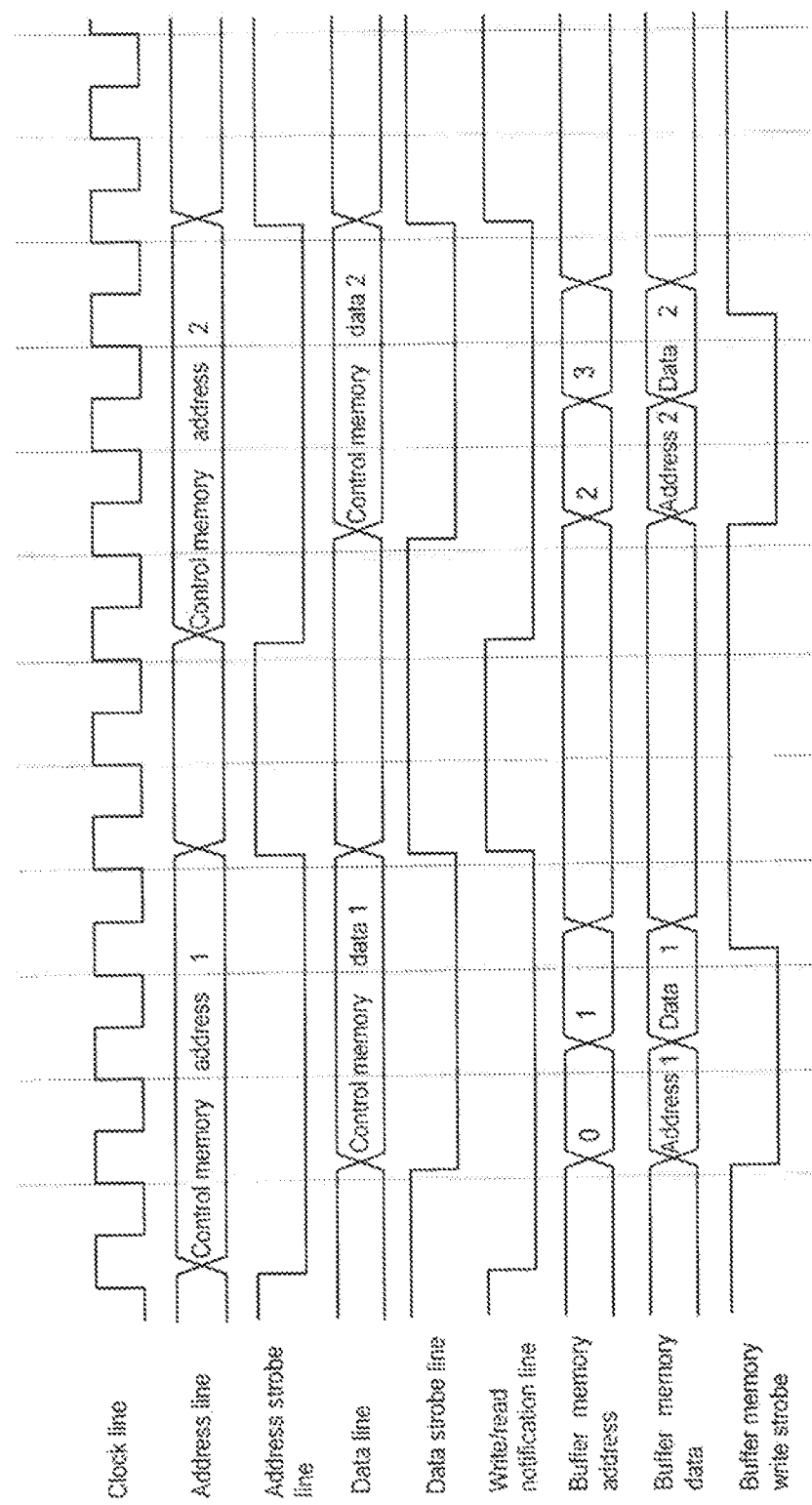
FIG. 4 is an operation explanatory diagram showing the writing to the control data memory monitored in the control data collection control unit of the control system controller, and the operation timing when the address and data at the time of writing are stored in the buffer memory according to the second embodiment of the present invention.

Hereinafter, embodiments of the present invention will be described below with reference to the drawing. FIG. 4 shows operation timing when monitoring the writing to the control data memory 12 by the control data collection control unit 13 of the control system controller 2 is performed, and then the address and data at the time of the writing are stored in the buffer memory 14.

Next, the operation will be described. In FIG. 4, a clock line, an address line, an address strobe line, a data line, a data strobe line, and a write/read notification line are signal lines constituting CPU bus connecting the CPU, the control data memory, and the control data collection control unit, and a buffer memory address line, a buffer memory data line, and a buffer memory write strobe line are signal lines constituting the buffer memory input bus 17 that connects the control data collection control unit 13 and the buffer memory 14.

When the CPU 11 writes to the control data memory 12, a signal is outputted to the CPU bus 16, at that time, the control data collection control unit 13 monitors the signal on the CPU bus 16 and detects the write operation. When the writing operation is detected, the address and data outputted to the CPU bus 16 are outputted to the buffer memory input bus 17, a buffer memory write strobe is outputted and written in the buffer memory 14.

The second embodiment has a function of monitoring the writing of the control data to the control data memory 12 by the control data collection control unit 13 of the control system controller 2, and of saving the control data in the buffer memory 14.

Further, the second embodiment is the duplexing process control device 1 in which the control data transmitted from the control system controller 2 to the standby system controller 3 is the control data written by the CPU 11 of the control system controller 2 to the control data memory 12.

Further, according to the second embodiment of the present invention, at the same time as writing in the control data memory 12, the data for equalization is transmitted to the buffer memory 24 of the standby system controller 3, in the standby system controller 3, when the storage in the buffer memory 24 is completed, the standby system controller 3 writes the control data in its own control data memory 22. Therefore, the equalization of the control data can be efficiently performed by transmitting only the updated control data.

Third Embodiment

Figure 5:
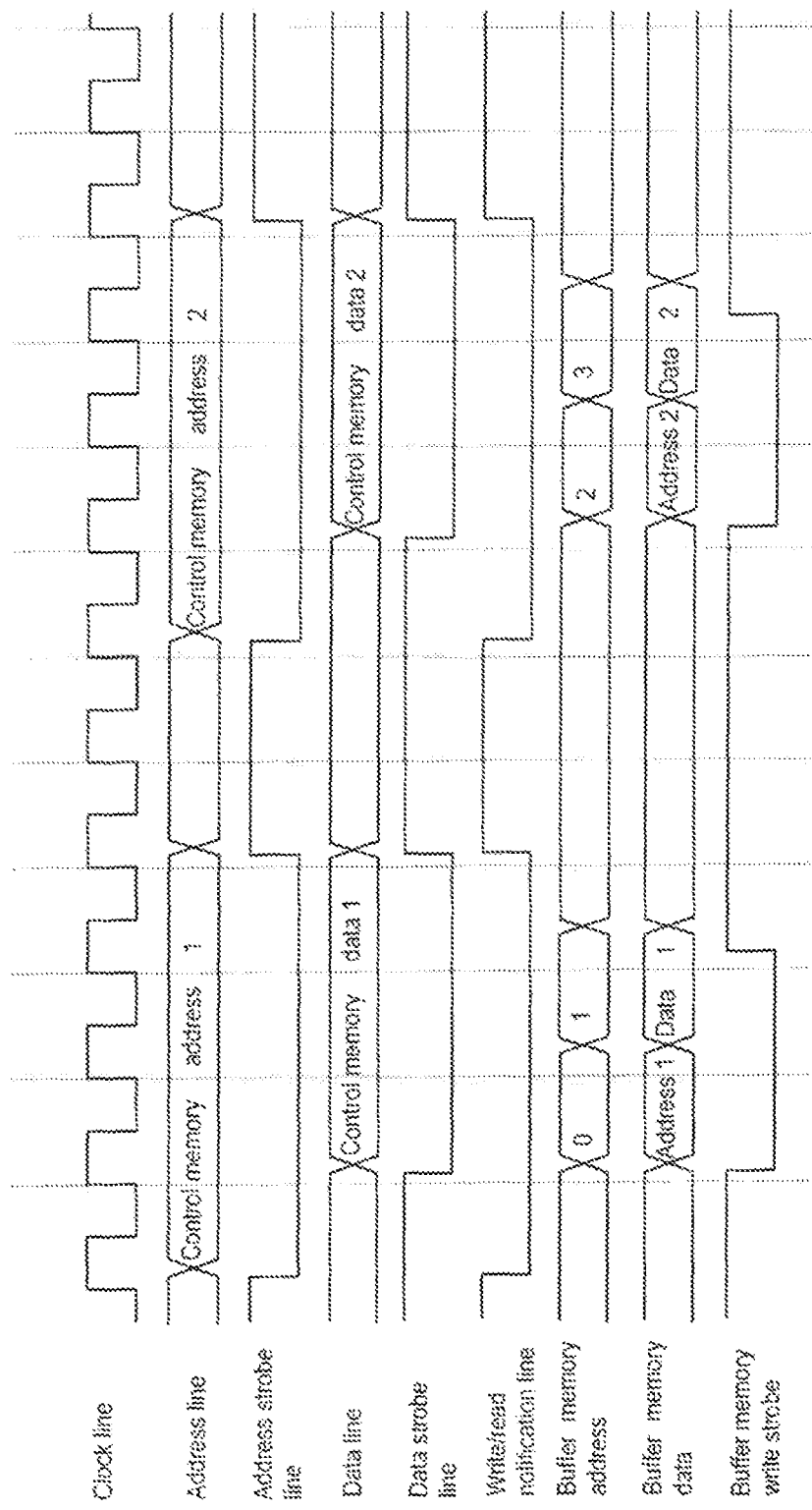
FIG. 5 is an operation explanatory diagram showing the reading from the control data memory monitored in the control data collection control unit of the control system controller, and the operation timing when the address and data at the time of reading are stored in the buffer memory according to the third embodiment of the present invention.

Hereinafter, embodiments of the present invention will be described below with reference to the drawing. FIG. 5 shows operation timing when monitoring the reading from the control data memory 12 by the control data collection control unit 13 of the control system controller 2 is performed, and then the address and data at the time of the reading are stored in the buffer memory 14.

Next, the operation will be described. In FIG. 5, the clock line, the address line, the address strobe line, the data line, the data strobe line, and the write/read notification line are signal lines constituting the CPU bus connecting the CPU, the control data memory, and the control data collection control unit, and the buffer memory address line, buffer memory data line, and the buffer memory write strobe line are signal lines constituting the buffer memory input bus 17 that connects the control data collection control unit 13 and the buffer memory 14.

When the CPU 11 reads the control data memory 12, a signal is outputted to the CPU bus 16, at that time, the control data collection control unit 13 monitors the signal of the CPU bus 16 and detects the read operation. When the reading operation is detected, the address and data outputted to the CPU bus 16 are outputted to the buffer memory input bus 17, the buffer memory write strobe is outputted, and the writing into the buffer memory 14 is performed.

The third embodiment has a function of monitoring the control data reading out from the control data memory 12 by the control data collection control unit 13 of the control system controller 2, and storing the control data in the buffer memory 14.

Further, the third embodiment is the duplexing process control device 1 wherein the control data transmitted from the control system controller 2 to the standby system controller 3 is the control data read out from the control data memory 12 by the CPU 11 of the control system controller 2.

According to the third embodiment of the present invention, simultaneously with the reading of the control data memory 2, the data for equalization is transmitted to the buffer memory 24 of the standby system controller 3, in the standby system controller 3, when the storage in the buffer memory 24 is completed, the standby system controller 3 writes the control data in its own control data memory 22. Therefore, it is possible to arbitrarily transmit control data requiring equalization.

Fourth Embodiment

The fourth embodiment of the present invention will be described below with reference to the drawing. FIG. 6 shows a configuration wherein the content of the control data memory 12 is stored in the buffer memory 14, start information for the first 2 words is stored, and then the address and the data are alternately stored in the address.

Start information 1 and start information 2 are composed of character strings that can recognize the start of control data transmission, and are written into the buffer memory 14 at the start of transmission of the control data by the control system controller 2.

In the standby system controller 3, when the start information 1 and the start information 2 are received, the standby system controller 3 recognizes the start of reception of the control data and starts the reception processing of the control data as well as the expansion of the control data to the control data memory 22.

The fourth embodiment is a configuration wherein the data transfer start information of the control data transmitted from the control system controller 2 to the standby system controller 3 is added to transmission data from the control system controller 2 to the standby system controller 3.

Further, the fourth embodiment is the duplexing process control device 1 wherein the information on the start of data transmission of the control data transmitted from the control system controller 2 to the standby system controller 3 is added to the control data transmitted from the control system controller 2 to the standby system controller 3.

According to the fourth embodiment of the present invention, since the data transfer start information of the data transfer of the control data transmitted from the control system controller 2 to the standby system controller 3 is added to the transmission data from the control system controller 2 to the standby system controller 3, it is possible to start the control data equalization conversion in the standby system controller 3 in synchronization with the control data transmission.

Fifth Embodiment

The fifth embodiment of the present invention will be described below with reference to the drawing. FIG. 7 shows contents of the control data memory stored in the buffer memory 14, in which the address and the data are alternately stored, and end information are stored for the last two words.

The end information 1 and the end information 2 are composed of character strings that can recognize the completion of control data transmission, and are written into the buffer memory 14 when the control data transmission is completed by the control system controller 2.

In the standby system controller 3, when the end information 1 and the end information 2 are received, the completion of the reception of the control data is recognized, and the expansion of the control data to the reception processing of the control data and the control data memory 22 is stopped.

The fifth embodiment is a configuration wherein the final data transfer completion information of the control data transmitted from the control system controller 2 to the standby system controller 3 is added to the transmission data from the control system controller 2 to the standby system controller 3.

Further, the fifth embodiment is the duplexing process control device 1 wherein, the information of the end data transfer completion of the control data transmitted from the control system controller 2 to the standby system controller 3, is added to the control data transmitted from the control system controller 2 to the standby system controller 3.

According to the fifth embodiment of the present invention, since the information of the end data transfer completion of the control data transmitted from the control system controller 2 to the standby system controller 3 is added to the transmission data from the control system controller 2 to the standby system controller 3, it is possible to complete the control data equalization in the standby system controller 3 in synchronization with the control data transmission.

Note that the present invention may be modified or omitted from each embodiment as appropriate within the scope of the invention.

Note that, in each drawing, the same symbols denote the same or equivalent portions.

REFERENCE SIGNS LIST

1 Duplexing process control device,
2 Control system controller,
3 Standby system controller,
4 Process input/output device,
5 Control target process,
6 Monitoring device,
7 Communication network,
8 Control data communication bus,
11, 21 CPU,
12, 22 Control data memory,
13 Control data collection control unit,
14, 24 Buffer memory,
15 Control data transmission control unit,
16, 26 CPU bus,
17 Buffer memory input bus in Control system controller,
18 Buffer memory output bus in Control system controller,
23 Control data expansion control unit,
25 Control data reception control unit,
27 Buffer memory output bus in Standby system controller,
28 Buffer memory input bus in Standby system controller.

The invention claimed is:

1. A duplexing process control device comprising a control system controller and a standby system controller, wherein
a control data targeting a program calculation and a process input/output by a CPU of the control system controller is stored in a control data memory of the control system controller,
wherein an address in the control data memory and the control data in the control data memory, which are accessed by the CPU of the control system controller when performing a program calculation, are stored in a buffer memory of the control system controller,
wherein the address and the control data stored in the buffer memory of the control system controller are transmitted to a buffer memory of the standby system controller for storage only during a process output operation resulting from the program calculation by the control system controller,
wherein, in the standby system controller, the control data transmitted from the control system controller is expanded from the buffer memory to a control data memory of the standby system controller using the address transmitted from the control system controller, wherein the expansion is in response to a signal notifying that the buffer memory has completed storing the address and the control data, and wherein the expansion occurs before the program calculation of a CPU of the standby system controller,
and wherein the CPU of the control system controller enables a control data collection flag to permit transfer of the control data to the standby system controller and clears the control data collection flag to stop additional control data collection for transfer to the standby system controller, wherein, in response to clearing the control data collection flag, a data transmission notifying signal is generated to cause reading of the buffer memory of the control system controller beginning at a head of the buffer memory of the control system controller,
thereby a control data equalization of the control system controller and the standby system controller is performed.

2. The duplexing process control device according to claim 1, wherein,
the address in the control data memory and the control data in the control data memory which are accessed when the CPU of the control system controller performs a program calculation are stored in the buffer memory of the control system controller at the time of the program calculation of the CPU of the control system controller,
when the control system controller performs process output, the address and the control data stored in the buffer memory of the control system controller are stored in the buffer memory of the standby system controller.

3. The duplexing process control device according to claim 1, wherein,
the control data transmitted from the control system controller to the standby system controller is the control data written in the control data memory by the CPU of the control system controller.

4. The duplexing process control device according to claim 1, wherein,
the control data transmitted from the control system controller to the standby system controller is the control data read from the control data memory by the CPU of the control system controller.

5. The duplexing process control device according to claim 1, wherein,
information on start of data transmission of control data transmitted from the control system controller to the standby system controller is added to the control data transmitted from the control system controller to the standby system controller.

6. The duplexing process control device according to claim 1, wherein,
information on end of end data transmission of the control data transmitted from the control system controller to the standby system controller is added to the control data transmitted from the control system controller to the standby system controller.

* * * * *